United States Patent [19]

Kim

[11] Patent Number: 5,760,861
[45] Date of Patent: Jun. 2, 1998

[54] LIQUID CRYSTAL DISPLAY DEVICE AND A METHOD FOR FABRICATING BLACK MATRIX THERETO

[75] Inventor: Woong Kwon Kim, Anyang, Rep. of Korea

[73] Assignee: LG Electronics, Inc., Seoul, Rep. of Korea

[21] Appl. No.: 744,306

[22] Filed: Nov. 6, 1996

[30] Foreign Application Priority Data

Feb. 3, 1996 [KR] Rep. of Korea .............. 1996-2639

[51] Int. Cl.$^6$ .............................. G02F 1/1333; G03F 9/00
[52] U.S. Cl. .............................. 349/110; 430/7
[58] Field of Search .................. 349/110, 111; 430/7

[56] References Cited

U.S. PATENT DOCUMENTS

| | | | |
|---|---|---|---|
| 4,610,509 | 9/1986 | Sorimachi et al. | 349/106 |
| 5,120,623 | 6/1992 | Brosig et al. | 430/20 |
| 5,281,305 | 1/1994 | Lee et al. | 156/657 |
| 5,499,125 | 3/1996 | Kim et al. | 349/110 |
| 5,510,916 | 4/1996 | Takahashi | 349/110 |
| 5,568,291 | 10/1996 | Murata et al. | 349/110 |

FOREIGN PATENT DOCUMENTS

| | | | |
|---|---|---|---|
| 4-280229 | 10/1992 | Japan . | |
| 5-188397 | 7/1993 | Japan | 349/110 |

*Primary Examiner*—William L. Sikes
*Assistant Examiner*—Teep H. Nguyen
*Attorney, Agent, or Firm*—Morgan, Lewis & Bockius LLP

[57] ABSTRACT

A liquid crystal display device includes a substrate, a light shielding layer having a substantial portion in the substrate, and an insulating layer over the light shielding layer and the substrate. A transistor includes gate, source, and drain electrodes over the insulating layer, the light shielding layer substantially covering the transistor. A data bus line is connected to one of the drain and source electrodes and a first light leakage region is adjacent the data bus line, the light shielding layer shielding the first light leakage region. A gate bus line connected to the gate electrode and a second light leakage region is adjacent the gate electrode, the light shielding layer shielding the second light leakage region. A pixel electrode contacts one of the source and drain electrodes of the transistor. A third light leakage region is between the data bus line and the pixel electrode, the light shielding region shielding the third light leakage region. A fourth light leakage region is between the gate bus line and the pixel electrode, the light shielding layer shielding the fourth light leakage region.

48 Claims, 8 Drawing Sheets

LIQUID CRYSTAL DISPLAY DEVICE AND A METHOD FOR FABRICATING BLACK MATRIX THERETO

BACKGROUND OF THE INVENTION

1. Field of the Invention

The present invention relates to a liquid crystal display device, and more particularly, to a black matrix of the liquid crystal display device.

2. Discussion of the Related Art

An active matrix liquid crystal display(AMLCD)is operated by thin film transistors(TFT)formed in the pixels. This AMLCD is a transparent type liquid crystal display device in which a back light is established in the rear of the liquid crystal panel. A real image is represented in the portion where the pixel electrode is formed. Accordingly,when the light is incident onto an area where the pixel electrode is not formed, that is, where the TFT, a gate bus line, and a data bus line are formed, this light leaks out to render the image indistinct. Thus, in an AMCLD, leakage of light through the regions of the TFT, the gate bus line, and the data bus line must be prevented.

FIG. 1 is a plan view of a conventional AMLCD. In FIG. 1, the TFT comprises a gate electrode 1, a drain electrode 2, and a source electrode 3. The gate electrode 1 is connected to the gate bus line 4 into which the gate signal is inputted, the drain electrode 2 is connected to the data bus line 5 into which the data signal is inputted, and the source electrode 3 is connected to the pixel electrode 6 which is transparent electrode. The TFT, the gate bus line 4, and the data bus line 5 are covered with a black matrix 7 to prevent back light(not shown)from passing through the regions of the TFT, the gate bus line 4 and the data bus line 5. In FIG. 1, the alternating long and short dash lines indicate the black matrix 7. The edge of the pixel electrode 6 is also substantially covered with the black matrix 7 to completely block the back light to the gap between the TFT and the pixel electrode, etc.

FIG. 2 is a cross-sectional view taken along line A–A' of FIG. 1. The TFT is formed on the lower substrate 20 and the black matrix 7 is formed on the upper substrate 30. The width of the black matrix 7 is larger than that of the TFT to cover the gap between the TFT and the pixel electrode 6. The TFT includes the gate electrode 1, which is formed on the lower substrate 20 by patterning a metal layer, an insulating layer 9 formed on the gate electrode 1, a semiconductor layer 10, an ohmic layer 11, the drain electrode 2, and the source electrode 3. On the above mentioned layers, a passivation layer 8 is formed including a contact hole at the area of the source electrode 3. A pixel electrode 6 is formed over the passivation layer 8 and contacts the source electrode 3 through the contact hole in the passivation layer 8. Thus, the source electrode 3 and the pixel electrode 6 are interconnected through the contact hole.

In the aforementioned liquid crystal display device, when the gate voltage from a gate driving circuit(not shown) is applied to the gate bus line 4, the TFT is turned on. The data signal inputted into the data bus line 5 from a data driving circuit(not shown) is applied to the pixel electrode 6. Then, the liquid crystal injected between the upper substrate 20 and the lower substrate 30 operates. When the incident light produced from a back light source(not shown) located at the rear side of the liquid crystal panel is transmitted, the desired images are represented in the area of the pixel electrode 6 according to the data signal applied to the pixel electrode 6. However, since the data signal is not applied outside the pixel, that is, the regions where the TFT, the gate bus line 4, and the data bus line 5 are formed, the incident light leaks through this area. Thus, the image is not represented in this area. To prevent the leakage of light, which is a significant factor in a deterioration of the image quality in the liquid crystal display device, a black matrix 7 is formed on the upper substrate 30. The black matrix 7 blocks the light transmitted to the TFT, the gate bus line 4, and the data bus line 5.

However, since the conventional black matrix 7 is formed on the surface of the upper substrate 30, the black matrix overlaps the pixel electrode. This decreases the aperture ratio when the lower substrate 20 and the upper substrate 30 are not aligned correctly, as shown in FIG. 2.

In order to prevent the decrease in the aperture ratio in the liquid crystal display device, a liquid crystal display device has been introduced, in which the black matrix is formed on the surface of the lower substrate, as shown in FIG. 3. In this type of liquid crystal display device, the black matrix 7 is formed on the surface of the lower substrate 20, and the TFT, the gate bus line 4, and the date bus line 5 are directly formed thereon. As a result, light which is transmitted through the area where the TFT, the gate bus line 4, and the data bus line are formed is completely blocked. In addition, since the black matrix 7 does not cover the pixel electrode 6 even when the upper substrate and lower substrate are incorrectly attached, the aperture ratio of this liquid crystal display device can be improved.

However, in the above mentioned liquid crystal display device, the TFT, the gate bus line 4, and the data bus line 5 are formed on the black matrix 7, and the pixel electrode 6 is formed on the passivation layer 8 coated on the TFT, the gate bus line 4, and the data bus line 5. Thus, a step phenomenon occurs in the pixel electrode 6 which is connected to the source electrode 3 through the contact hole. Moreover, since the degree of flatness of the substrate deteriorates due to the black matrix 7, a non-uniform gap forms between the upper substrate and the lower substrate.

SUMMARY OF THE INVENTION

Accordingly, the present invention is directed to a liquid crystal display device and a method for fabricating a black matrix that substantially obviates one or more of the problems due to limitations and disadvantages of the related art.

An object of the present invention is to provide a liquid display device in which the quality of image is improved.

Another object of the present invention is to provide a liquid crystal display device in which the aperture ratio is improved.

A further object of the present invention is to provide a method for fabricating a black matrix in the liquid crystal display device for improving an aperture ratio and improving image quality.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, a liquid crystal display device comprises a substrate; a light shielding layer having at least a portion in the substrate;an insulating layer over the light shielding layer and the substrate; and a transistor including gate, source, and drain electrodes over the insulating layer corresponding to the light shielding layer.

In another aspect, the present invention provides a liquid crystal display device, comprising a substrate; a light shielding layer having at least a portion in the substrate; a transparent insulating layer over the light shielding layer and the substrate;and a transistor including: a gate electrode over a portion of the transparent insulating layer; a gate insulating layer on the gate electrode; a semiconductor layer on the gate insulating layer over the gate electrode; source and drain electrodes over the semiconductor layer; and an ohmic contact layer between the semiconductor layer and the source and drain electrodes.

In another aspect, the present invention provides a method for fabricating black matrix in a liquid crystal display device having a substrate, the method comprising the steps of removing a part of the substrate; forming the black matrix in an etched area of the substrate; and forming a thin film transistor, a gate bus line, and a data bus line on the black matrix.

In another aspect, the present invention provides a liquid crystal display device, comprising a substrate;a light shielding layer having a substantial portion in the substrate; an insulating layer over the light shielding layer and the substrate; a transistor including gate, source, and drain electrodes over the insulating layer, the light shielding layer substantially covering the transistor; a data bus line connected to one of the drain and source electrodes; a first light leakage region adjacent the data bus line, the light shielding layer shielding the first light leakage region; a gate bus line connected to the gate electrode; a second light leakage region adjacent the gate electrode, the light shielding layer shielding the second light leakage region; a pixel electrode contacting one of the source and drain electrodes of the transistor; a third light leakage region between the data bus line and the pixel electrode, the light shielding region shielding the third light leakage region; and a fourth light leakage region between the gate bus line and the pixel electrode, the light shielding layer shielding the fourth light leakage region.

In another aspect, the present invention provides a liquid crystal display device, comprising a substrate; a light shielding layer having a substantial portion in the substrate; a transparent insulating layer over the light shielding layer and the substrate; a transistor including: a gate electrode over a portion of the transparent insulating layer, a gate insulating layer on the gate electrode, a semiconductor layer on the gate insulating layer over the gate electrode, source and drain electrodes over the semiconductor layer; and an ohmic contact layer between the semiconductor layer and the source and drain electrodes; wherein the light shielding layer substantially covers the transistor; a data bus line connected to one of the drain and source electrodes; a first light leakage region adjacent the data bus line, the light shielding layer shielding the first light leakage region; a gate bus line connected to the gate electrode; a second light leakage region adjacent the gate electrode, the light shielding layer shielding the second light leakage region; a pixel electrode contacting one of the source and drain electrodes of the transistor; a third light leakage region between the data bus line and the pixel electrode, the light shielding region shielding the third light leakage region; and a fourth light leakage region between the gate bus line the pixel electrode, the light shielding layer shielding the fourth light leakage region.

In another aspect, the present invention provides a method of fabricating a liquid crystal display device having a substrate, the method comprising the steps of forming a light shielding layer having a substantial portion in the substrate; forming an insulating layer over the light shielding layer and the substrate; forming a transistor including gate, source, and drain electrodes over the insulating layer, and substantially covering the transistor using the light shielding layer; forming a data bus line connected to one of the drain and source electrodes; shielding a first light leakage region adjacent the data bus line using the light shielding layer; forming a gate bus line connected to the gate electrode; shielding a second light leakage region adjacent the gate electrode using the light shielding layer; forming a pixel electrode contacting one of the source and drain electrodes of the transistor; shielding a third light leakage region between the data bus line and the pixel electrode using the light shielding region; and shielding a fourth light leakage region between the gate bus line and the pixel electrode using the light shielding layer.

In another aspect, the present invention provides a method of fabricating a liquid crystal display device having a substrate, the method comprising the steps of forming a light shielding layer having a substantial portion in the substrate; forming a transparent insulating layer over the light shielding layer and the substrate; forming a transistor including the steps of: forming a gate electrode over a portion of the transparent insulating layer, forming a gate insulating layer on the gate electrode, forming a semiconductor layer on the gate insulating layer over the gate electrode, forming source and drain electrodes over the semiconductor layer; and forming an ohmic contact layer between the semiconductor layer and the source and drain electrodes; substantially covering the transistor using the light shielding layer; forming a data bus line connected to one of the drain and source electrodes; shielding a first light leakage region adjacent the data bus line using the light shielding layer; forming a gate bus line connected to the gate electrode; shielding a second light leakage region adjacent the gate electrode using the light shielding layer; forming a pixel electrode contacting one of the source and drain electrodes of the transistor; shielding a third light leakage region between the data bus line and the pixel electrode using the light shielding region; and shielding a fourth light leakage region between the gate bus line and the pixel electrode using the light shielding layer.

In another aspect, the present invention provides a liquid crystal display device and a method for fabricating a black matrix of the present invention comprising a substrate, a black matrix formed in the substrate, a gate bus line, and a data bus line formed on the black matrix in which the gate signal and the data signal are inputted, a pixel electrode formed on the substrate, a thin film transistor formed on the black matrix in which the gate electrode, the drain electrode, and the source electrode are connected to the gate bus line, the data bus line, and the pixel electrode, respectively.

In a further aspect, the present invention provides a method for fabricating a black matrix in a liquid crystal display device comprising the steps of etching the substrate, forming the black matrix into an etched area of the substrate, coating a transparent insulating layer on the whole area of the substrate, and forming a thin film transistor, the gate bus line, and the data bus line over the black matrix.

In is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
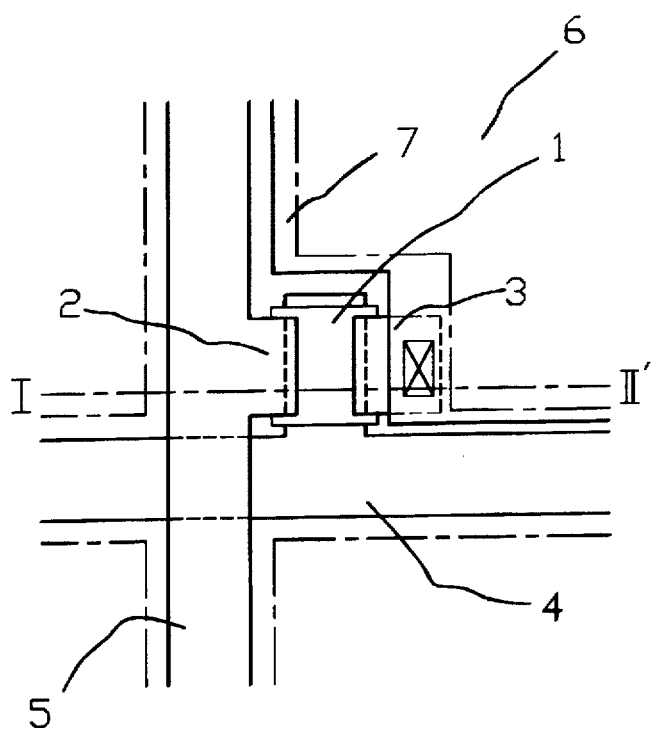
FIG. 1 is a plan view of the conventional liquid crystal display device.
Figure 2:
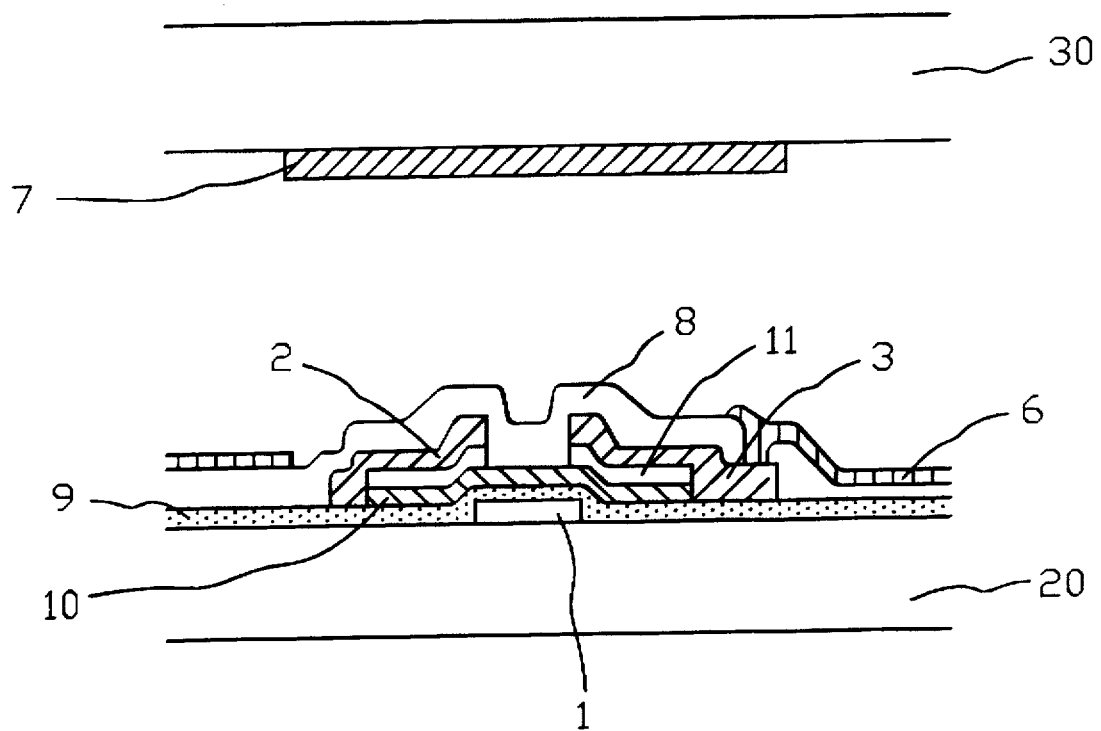
FIG. 2 is a cross sectional view taken of line A–A' of FIG. 1.
Figure 3:
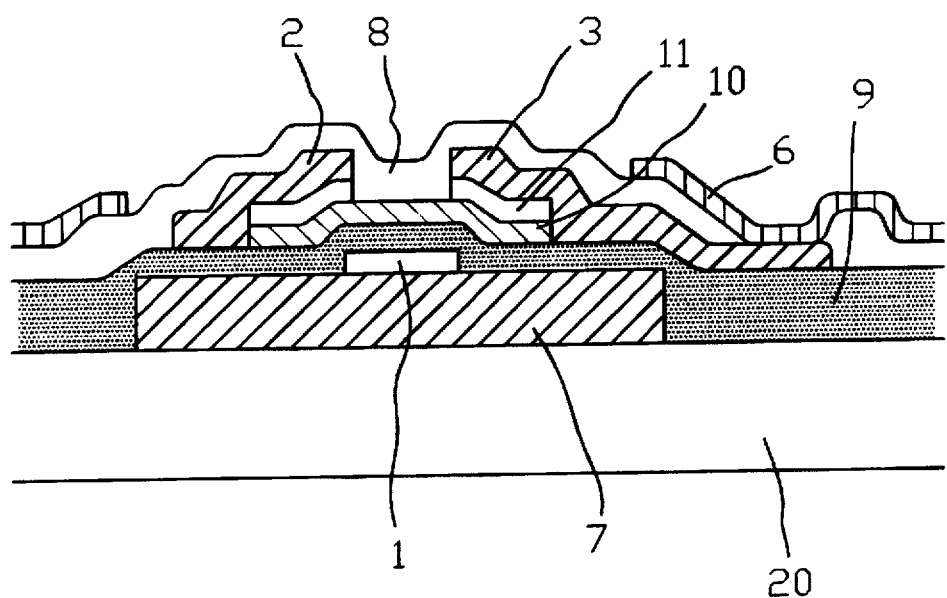
FIG. 3 is a cross sectional view of the conventional liquid crystal display device in which thin film transistor, gate bus line, and data bus lines are formed on a black matrix.
Figure 4A:
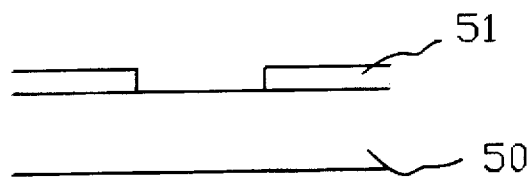
FIGS. 4a–4d illustrate one embodiment of a fabricating process of a black matrix according to the present invention.
Figure 4B:
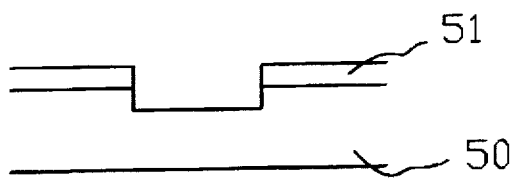

Referring to FIGS. 4a–4b, a method for fabricating the black matrix is explained in detail.

Figure 4C:
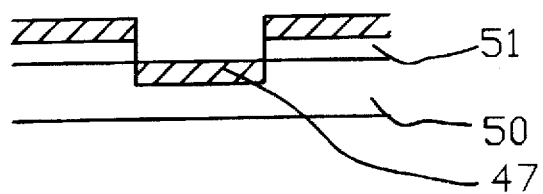
Figure 4D:
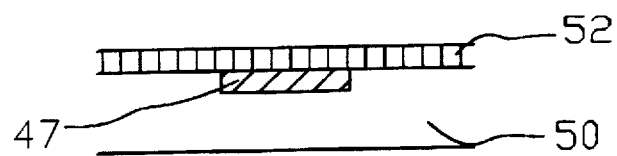

As shown in FIGS. 4a and 4b, a photosensitive layer 51 is spreaded out or applied on a glass substrate 50 and patterned using a mask into a desired shape. Then, the glass substrate 50, on which the photosensitive layer 51 is patterned, is etched by dry etching or wet etching methods. Thereafter, a black matrix 47, which includes a negative type of black resin, is coated on the photosensitive layer 51 and the etched area of the glass substrate 50. Then, the photosensitive layer 51 and the black resin coated on the photosensitive layer 51 are removed by irradiating light into the substrate 51 from below, that is, by exposure of back light, so that the black matrix 47 is formed only at the etched area of the glass substrate 50, as shown in FIG. 4c. Subsequently, a transparent insulating layer 52, such as SiOx or SiNx, is coated on the glass substrate 50 and the black matrix 47. Then, a TFT, a gate bus line 44, and a data bus line 45 are formed thereon, as shown in FIG. 5a.

Figure 5A:
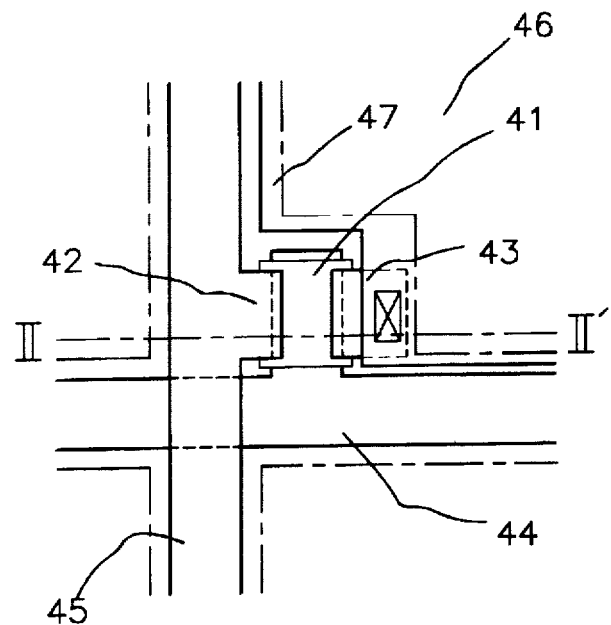
FIGS. 5a and 5b illustrate the present liquid crystal display device fabricated according to FIGS. 4a–4d.
Figure 5B:
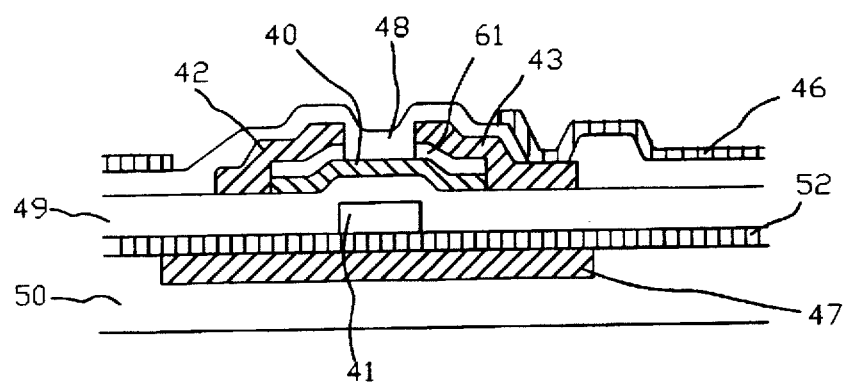

FIG. 5a is a plan view of the liquid crystal display device fabricated by the above mentioned method and FIG. 5b is a cross sectional view taken along line B–B' of FIG. 5a. FIG. 5a illustrates one pixel of the liquid crystal display device. Referring to FIG. 5a, the gate bus line 44 and the data bus line 45 cross each other. At a corner between the gate bus line 44 and the data bus line 45, the TFT having the gate electrode 41 and the drain electrode 42 is connected to the gate bus line 44 and the data bus line 45, respectively. Further, the pixel electrode 46 is also formed at the corner between the gate bus line 44 and data line 45, and connected to the source electrode 43 of the TFT.

In FIG. 5b, the black matrix 47 is formed only at the etched area of the glass substrate 50 and the transparent insulating layer 52 is coated on the whole area of the substrate 50. On the transparent insulating layer 52, the patterned gate electrode 41 is formed and the gate insulating layer 49 is coated thereon.

The semiconductor layer 40 and subsequent ohmic layer 61 are formed on the gate insulating layer 49, and the drain electrode 42 and the source electrode 43 are formed thereon. Furthermore, the passivation layer 48 in which a contact hole is formed is coated on the TFT. The source electrode 43 and the pixel electrode 46, which includes indium tin oxide(ITO), are interconnected through the contact hole of the passivation layer 48.

In the above mentioned liquid crystal display device, since the TFT, the gate bus line 44, and the data bus line 45 are deposited on the black matrix 47 formed in the lower substrate, the incident light which is transmitted through the regions including the TFT, the gate bus line 44, and data bus line 45 is completely blocked. In addition, the lower substrate in which the black matrix is formed has adequate flatness, so that a gap between the upper substrate and the lower substrate is uniform. Further, since the black matrix 47 is formed in the etched area of the glass substrate 50, the present invention overcomes a problem in the conventional liquid crystal display device where a step is generated at the pixel electrode from forming the black matrix on the glass substrate and then depositing the TFT, the gate bus line, and the data bus line thereon.

Figure 6A:
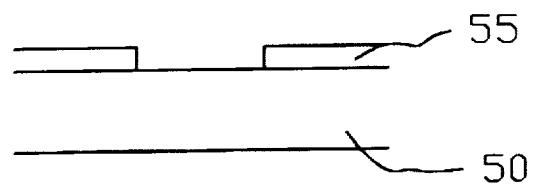
FIGS. 6a–6d illustrate another embodiment of a fabricating process of a black matrix according to the present invention.
Figure 6B:
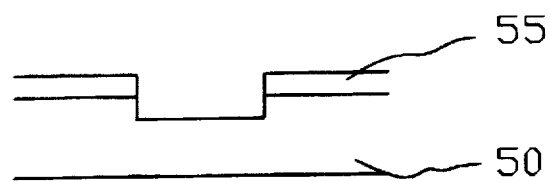
Figure 6C:
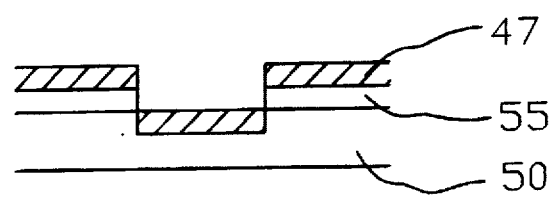
Figure 6D:
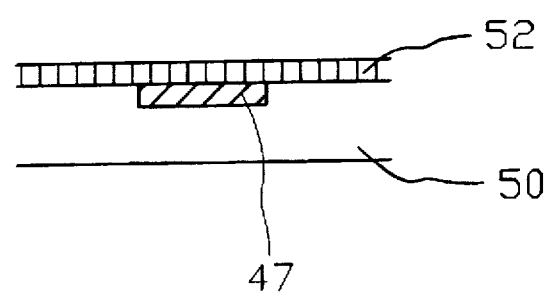

FIGS. 6a and 6d illustrate another embodiment of the present invention, where a metal layer is used for etching the glass substrate instead of a photosensitive layer.

Referring to FIGS. 6a and 6b, a metal layer 55 is patterned by a mask on a glass substrate 50, and then the glass substrate 50 is etched by photolithography. Subsequently, a negative type of black resin is coated on the whole area of the glass substrate 50. Then, the metal layer 55 and the black resin coated on the metal layer 55 are removed by back exposure of light. As a result, the black resin, i.e., a black matrix 47, is formed only at the etched area of the glass substrate 50. A transparent insulating layer 52 is formed over a resulting surface of the substrate, as shown in FIG. 6d. Furthermore, a TFT, a gate bus line, and a data bus line are deposited on the black matrix 47, as discussed with reference to FIGS. 7a and 7b below.

Figure 7A:
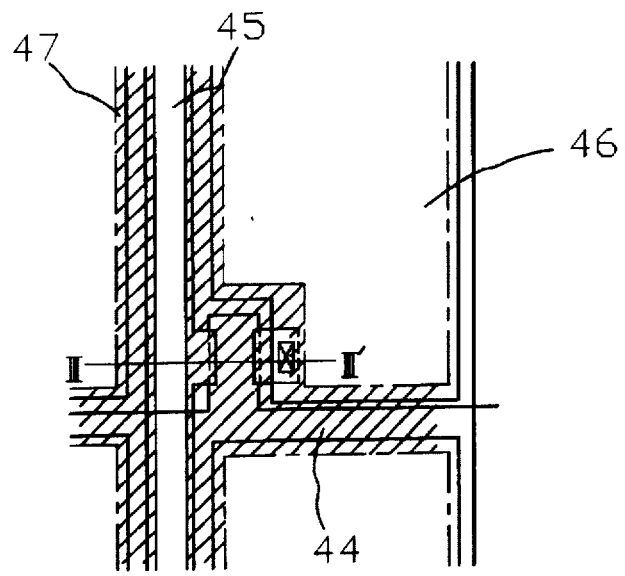
FIGS. 7a and 7b illustrate a liquid crystal display device in which data bus line includes a non-transparent material according to the present invention.

FIG. 7a is a plan view illustrating the structure of another embodiment of the present invention and 7b is a cross-sectional view taken along C–C' line of FIG. 7a. In this embodiment of the liquid crystal display device, the data bus line 45 includes a non-transparent material. Accordingly, the incident light from the back light can not transmit through the area where the data bus line 45 is formed. Thus, the black matrix 47 need not be formed in the area of the data bus line 45. In other words, the black matrix 47 formed in the region of the data bus line 45 is divided into two parts to cover the gap between the data bus line 45 and the pixel electrode 46. Thus, the generation of stress in the black matrix is prevented.

In the aforementioned liquid crystal display device of the present invention, since the black matrix 47 is formed in the etched area of the glass substrate 50 and the TFT, gate bus line, and data bus line are deposited thereon, the aperture ratio of the liquid crystal display device is improved. Also, the gap between the upper substrate and the lower substrate becomes uniform.

In addition, since the transparent insulating layer 52 is coated on the glass substrate 50 where the black matrix 47 is formed, and the TFT, the gate bus line, and the data bus line are deposited thereon, the generation of a step in the pixel electrode caused by the black matrix is prevented.

Accordingly, the black matrix of the liquid crystal display device of the present invention is formed into an etched area of a glass substrate to block light which is transmitted through the substrate so that the aperture ratio of the liquid crystal display device is improved and the generation of the step in a pixel electrode is prevented.

Figure 7B:
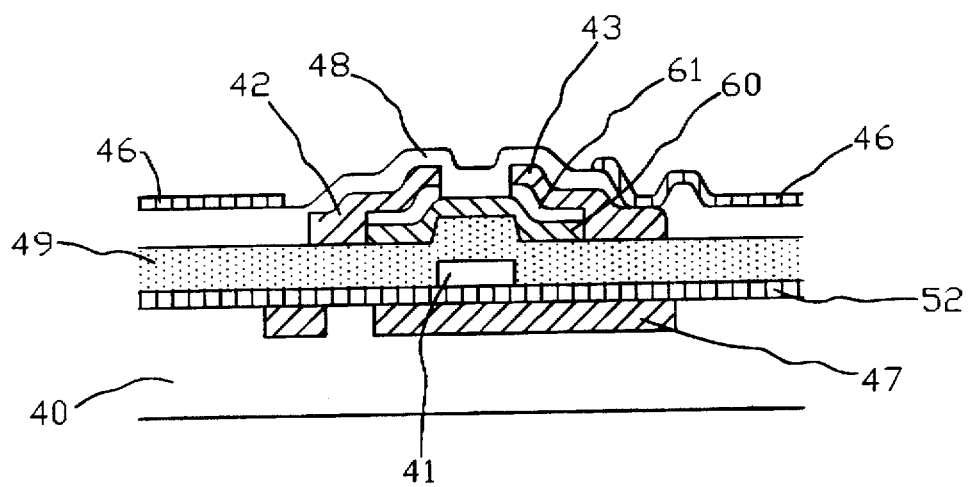
Figure 8:
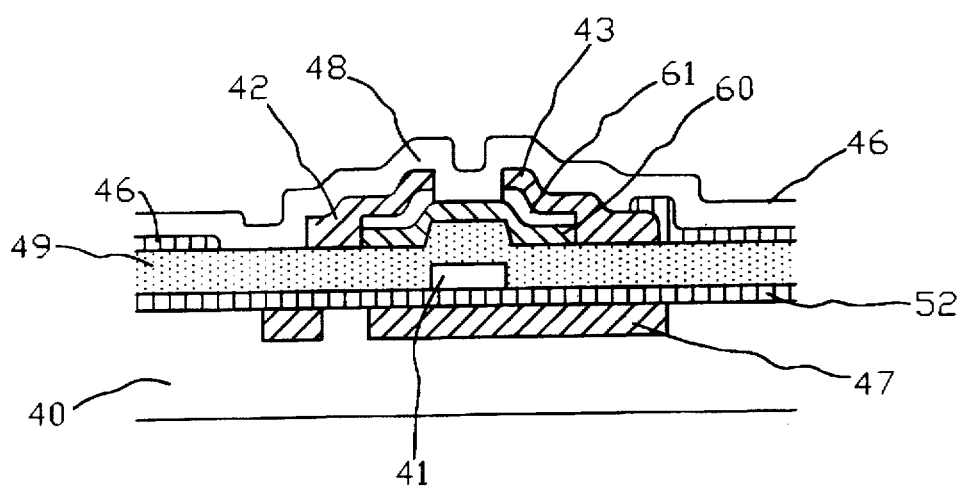
FIG. 8 is a cross-sectional view of a liquid crystal display illustrating an alternative structure of the pixel electrode.

In the preferred embodiments above, the pixel electrode 46 is formed over the passivation layer 48, as shown in FIGS. 5b and 7b. Alternatively, the pixel electrode 46 may be formed under the passivation layer 48, as shown in FIG. 8.

It will be apparent to those skilled in the art that various modifications and variations can be made in the liquid crystal display device and a method for fabricating black matrix thereto of the present invention without departing from the spirit or scope of the invention. For example, applications such as where the TFT or the gate bus line includes non-transparent material to form a plurality of parts of the black matrix in the region of the TFT or the gate bus line, and where both TFT and gate bus line includes non-transparent material to form the plural part of the black matrix in the regions of both TFT and gate bus line(except for the data bus line in embodiments of the present invention) are ramifications of the present invention although not shown in the drawings. Thus, it is intended that the present invention cover the modifications and variations of this invention provided they come within the scope of the appended claims and their equivalents.

What is claimed is:

1. A liquid crystal display device, comprising:
   a substrate;
   a light shielding layer having at least a portion in the substrate;
   an insulating layer over the light shielding layer and the substrate; and
   a transistor including gate, source, and drain electrodes over an area of the insulating layer corresponding to the light shielding layer.

2. The liquid crystal display device according to claim 1, wherein the light shielding layer is substantially within the substrate.

3. The liquid crystal display device according to claim 1, wherein the light shielding layer covers the transistor.

4. The liquid crystal display device according to claim 1, further comprising a data bus line connected to one of the drain and source electrodes.

5. The liquid crystal display device according to claim 4, wherein the light shielding layer shields a light leakage region adjacent the data bus line.

6. The liquid crystal display device according to claim 1, further comprising a gate bus line connected to the gate electrode.

7. The liquid crystal display device according to claim 6, wherein the light shielding layer shields a light leakage region adjacent the gate bus line.

8. The liquid crystal display device according to claim 1, wherein the light shielding layer includes a light blocking resin.

9. The liquid crystal display device according to claim 8, wherein the light blocking resin includes black resin.

10. The liquid crystal display device according to claim 1, wherein the light blocking resin includes negative resin.

11. The liquid crystal display device according to claim 1, wherein the light shielding layer includes a black matrix.

12. The liquid crystal display device according to claim 1, further comprising a pixel electrode contacting one of the source and drain electrodes of the transistor.

13. The liquid crystal display device according to claim 12, wherein the light shielding layer shields a light leakage region at least between the data bus line and the pixel electrode.

14. The liquid crystal display device according to claim 12, wherein the light shielding layer shields a light leakage region at least between the gate bus line and the pixel electrode.

15. A liquid crystal display device, comprising:
   a substrate;
   a light shielding layer having at least a portion in the substrate;
   a transparent insulating layer over the light shielding layer and the substrate; and
   a transistor including:
      a gate electrode over a portion of the transparent insulating layer;
      a gate insulating layer on the gate electrode;
      a semiconductor layer on the gate insulating layer over the gate electrode;
      source and drain electrodes over the semiconductor layer; and
      an ohmic contact layer between the semiconductor layer and the source and drain electrodes.

16. The liquid crystal display device according to claim 15, further comprising:
   a passivation layer over the source and drain electrodes, the passivation layer having a contact hole over one of the source and drain electrodes; and
   a pixel electrode contacting one of the source and drain electrodes through the contact hole.

17. The liquid crystal display device according to claim 15, further comprising:
   a pixel electrode over the gate insulating layer and contacting one of the source and drain electrodes; and
   a passivation layer over the pixel electrode.

18. The liquid crystal display device according to claim 17, wherein the light shielding layer shields a light leakage region at least between the data bus line and the pixel electrode.

19. The liquid crystal display device according to claim 17, wherein the light shielding layer shields a light leakage region at least between the gate bus line and the pixel electrode.

20. The liquid crystal display device according to claim 16, wherein the light shielding layer shields a light leakage region at least between the data bus line and the pixel electrode.

21. The liquid crystal display device according to claim 16, wherein the light shielding layer shields a light leakage region at least between the gate bus line and the pixel electrode.

22. The liquid crystal display device according to claim 15, wherein the light shielding layer is substantially within the substrate.

23. The liquid crystal display device according to claim 15, wherein the light shielding layer covers the transistor.

24. The liquid crystal display device according to claim 15, further comprising a data bus line connected to one of the drain and source electrodes.

25. The liquid crystal display device according to claim 24, wherein the light shielding layer shields a light leakage region adjacent the data bus line.

26. The liquid crystal display device according to claim 15, further comprising a gate bus line connected to the gate electrode.

27. The liquid crystal display device according to claim 26, wherein the light shielding layer shields a light leakage region adjacent the gate bus line.

28. The liquid crystal display device according to claim 15, wherein the light shielding layer includes a light blocking resin.

29. The liquid crystal display device according to claim 28, wherein the light blocking resin includes black resin.

30. The liquid crystal display device according to claim 28, wherein the light blocking resin includes negative resin.

31. The liquid crystal display device according to claim 15, wherein the light shielding layer includes a black matrix.

32. A method for fabricating a liquid crystal display device having a substrate, the method comprising the steps of:
   forming a light shielding layer having at least a portion in the substrate;
   forming an insulating layer over the light shielding layer and the substrate; and
   forming a transistor including gate, source, and drain electrodes over an area of the insulating layer corresponding to the light shielding layer.

33. A method for fabricating a liquid crystal display device having a substrate, the method comprising the steps of:
   forming a light shielding layer having at least a portion in the substrate;
   forming a transparent insulating layer over the light shielding layer and the substrate; and
   forming a transistor including the steps of:
      forming a gate electrode over a portion of the transparent insulating layer;
      forming a gate insulating layer on the gate electrode;
      forming a semiconductor layer on the gate insulating layer over the gate electrode;
      forming source and drain electrodes over the semiconductor layer; and
      forming an ohmic contact layer between the semiconductor layer and the source and drain electrodes.

34. A method for fabricating black matrix in a liquid crystal display device having a substrate, the method comprising the steps of:
   removing an area of the substrate through etching;
   forming the black matrix in the etched area of the substrate; and
   forming a thin film transistor, a gate bus line, and a data bus line on the black matrix.

35. The method according to claim 34, wherein the step of forming the black matrix includes the steps of:
   forming a photosensitive layer having an aperture on the substrate;
   forming a black layer on the photosensitive layer and the etched area of the substrate; and
   removing the photosensitive layer and the black matrix formed on the photosensitive layer to form the black matrix in the etched area of the substrate.

36. The method according to claim 35, wherein the step of removing the photosensitive layer includes the step of exposing the photosensitive layer to back light.

37. The method according to claim 34, further comprising the steps of:
   forming a metal layer having an aperture on the substrate;
   forming a black layer on the metal layer and the etched area of the substrate; and
   removing the metal layer and the black matrix formed on the metal layer to form the black matrix in the etched area of the substrate.

38. The method according to claim 37, wherein the step of removing the metal layer includes the step of exposing the metal to back light.

39. The method according to claim 34, further comprising the steps of forming an insulating layer on the substrate and the black matrix.

40. The method according to claim 34, wherein the step of removing the part of the substrate uses one of dry and wet etching.

41. A liquid crystal display device, comprising:
   a substrate;
   a light shielding layer having a substantial portion in the substrate;
   an insulating layer over the light shielding layer and the substrate;
   a transistor including gate, source, and drain electrodes over the insulating layer, the light shielding layer substantially covering the transistor;
   a data bus line connected to one of the drain and source electrodes;
   a first light leakage region adjacent the data bus line, the light shielding layer shielding the first light leakage region;
   a gate bus line connected to the gate electrode;
   a second light leakage region adjacent the gate electrode, the light shielding layer shielding the second light leakage region;
   a pixel electrode contacting a remaining one of the source and drain electrodes of the transistor;
   a third light leakage region between the data bus line and the pixel electrode, the light shielding region shielding the third light leakage region; and
   a fourth light leakage region between the gate bus line and the pixel electrode, the light shielding layer shielding the fourth light leakage region.

42. A liquid crystal display device, comprising:
   a substrate;
   a light shielding layer having a substantial portion in the substrate;
   a transparent insulating layer over the light shielding layer and the substrate;
   a transistor including:
      a gate electrode over a portion of the transparent insulating layer;
      a gate insulating layer on the gate electrode;
      a semiconductor layer on the gate insulating layer over the gate electrode;
      source and drain electrodes over the semiconductor layer; and
      an ohmic contact layer between the semiconductor layer and the source and drain electrodes; wherein the light shielding layer substantially covers the transistor;
   a data bus line connected to one of the drain and source electrodes;
   a first light leakage region adjacent the data bus line, the light shielding layer shielding the first light leakage region;
   a gate bus line connected to the gate electrode;
   a second light leakage region adjacent the gate electrode, the light shielding layer shielding the second light leakage region;
   a pixel electrode contacting a remaining one of the source and drain electrodes of the transistor;

a third light leakage region between the data bus line and the pixel electrode, the light shielding region shielding the light leakage region; and a fourth light leakage region between the gate bus line and the pixel electrode, the light shielding layer shielding the fourth light leakage region.

43. The liquid crystal display device according to claim 42, further comprising:

a passivation layer over the source and drain electrodes, the passivation layer having a contact hole over the remaining one of the source and drain electrodes, and wherein the pixel electrode is contacting the remaining one of the source and drain electrodes through the contact hole.

44. The liquid crystal display device according to claim 42, further comprising:

a passivation layer over the pixel electrode, and wherein the pixel electrode is over the gate insulating layer and contacting one of the source and drain electrodes.

45. A method of fabricating a liquid crystal display device having a substrate, the method comprising the steps of:

forming a light shielding layer having a substantial portion in the substrate;

forming an insulating layer over the light shielding layer and the substrate;

forming a transistor including gate, source, and drain electrodes over the insulating layer, and substantially covering the transistor using the light shielding layer;

forming a data bus line connected to one of the drain and source electrodes;

shielding a first light leakage region adjacent the data bus line using the light shielding layer;

forming a gate bus line connected to the gate electrode;

shielding a second light leakage region adjacent the gate electrode using the light shielding layer;

forming a pixel electrode contacting a remaining one of the source and drain electrodes of the transistor;

shielding a third light leakage region between the data bus line and pixel electrode using the light shielding region; and shielding a fourth light leakage region between the gate bus line and the pixel electrode using the light shielding layer.

46. A method of fabricating a liquid crystal display device having a substrate, the method comprising the steps of:

forming a light shielding layer having a substantial portion in the substrate;

forming a transparent insulating layer over the light shielding layer and the substrate;

forming a transistor including the steps of:

forming a gate electrode over portion of the transparent insulating layer;

forming a gate insulating layer on the gate electrode;

forming a semiconductor layer on the gate insulating layer insulating layer over the gate electrode;

forming source and drain electrodes over the semiconductor layer; and forming an ohmic contact layer between the semiconductor layer and the source and drain electrodes;

substantially covering the transistor using the light shielding layer;

forming a data bus line connected to one of the drain and source electrodes;

shielding a first light leakage region adjacent the data bus line using the light shielding layer;

forming a gate bus line connected to the gate electrode;

shielding a second light leakage region adjacent the gate electrode using the light shielding layer;

forming a pixel electrode contacting a remaining one of the source and drain electrodes of the transistor;

shielding a third light leakage region between the data bus line and the pixel electrode using the light shielding region; and shielding a fourth light leakage region between the gate bus line and the pixel electrode using the light shielding layer.

47. The method according to claim 46, further comprising the steps of:

forming a passivation layer over the source and drain electrodes, the passivation layer having a contact hole over one of the source and drain electrodes; and forming the pixel electrode contacting the remaining one of the source and drain electrodes through the contact hole.

48. The method according to claim 46, further comprising the steps of:

forming the pixel electrode over the gate insulating layer and contacting the remaining one one of the source and drain electrodes; and forming a passivation layer over the pixel electrodes.

* * * * *